(12) United States Patent
Chen

(10) Patent No.: US 10,728,613 B2
(45) Date of Patent: Jul. 28, 2020

(54) METHOD AND APPARATUS FOR CONTENT INSERTION DURING VIDEO PLAYBACK, AND STORAGE MEDIUM

(71) Applicant: TENCENT TECHNOLOGY (SHENZHEN) COMPANY LIMITED, Shenzhen (CN)

(72) Inventor: Junfeng Chen, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 15/824,247

(22) Filed: Nov. 28, 2017

(65) Prior Publication Data
US 2018/0084302 A1 Mar. 22, 2018

Related U.S. Application Data

(63) Continuation of application No. PCT/CN2016/082493, filed on May 18, 2016.

(30) Foreign Application Priority Data

Sep. 7, 2015 (CN) .......................... 2015 1 0562909

(51) Int. Cl.
*H04N 21/44* (2011.01)
*H04N 21/472* (2011.01)
(Continued)

(52) U.S. Cl.
CPC ..... *H04N 21/44016* (2013.01); *G06Q 10/101* (2013.01); *G06Q 30/02* (2013.01);
(Continued)

(58) Field of Classification Search
CPC ......... H04N 21/2387; H04N 21/47217; H04N 21/2343; H04N 21/26283; H04N 21/812;
(Continued)

(56) References Cited

U.S. PATENT DOCUMENTS 7,904,922 B1 * 3/2011 Haberman ........... G06Q 10/107
715/201
8,479,228 B1 * 7/2013 Simon ................ G06Q 30/0241
709/219
(Continued)

FOREIGN PATENT DOCUMENTS

CN 101184248 A 5/2008
CN 101390032 A 3/2009
(Continued)

OTHER PUBLICATIONS

The World Intellectual Property Organization (WIPO) International Search Report for PCT/CN2016/082493 dated Jul. 22, 2016 6 Pages (including translation).
The State Intellectual Property Office of the People's Republic of China (SIPO) Office Action 1 for 201510562909.0 dated Jun. 28, 2019 11 Pages (including translation).

*Primary Examiner* — Nasser M Goodarzi
*Assistant Examiner* — Patrick A Ryan
(74) *Attorney, Agent, or Firm* — Anova Law Group, PLLC

(57) ABSTRACT

A method for content insertion during video playback, including: receiving, by a computing terminal including at least one processor, a setting parameter and insertion content, the setting parameter comprising an insertion time period and an insertion region of the insertion content in a video; and importing, by the computing terminal, the insertion content to the insertion region within the insertion time period.

20 Claims, 5 Drawing Sheets

Display insertion content in an insertion region within an insertion time period, and output an editing interface — S230

Edit the insertion content according to a received editing instruction — S240

Replace video content that is in the insertion region with the edited insertion content — S250

(51) Int. Cl.
*H04N 21/458* (2011.01)
*H04N 21/81* (2011.01)
*H04N 21/45* (2011.01)
*H04N 21/4728* (2011.01)
*H04N 21/432* (2011.01)
*H04N 21/431* (2011.01)
*G06Q 10/10* (2012.01)
*G06Q 30/02* (2012.01)
*H04N 21/234* (2011.01)
*H04N 21/2343* (2011.01)
*H04N 21/2387* (2011.01)
*H04N 21/262* (2011.01)

(52) U.S. Cl.
CPC ..... *H04N 21/2343* (2013.01); *H04N 21/2387* (2013.01); *H04N 21/23424* (2013.01); *H04N 21/26283* (2013.01); *H04N 21/4316* (2013.01); *H04N 21/4325* (2013.01); *H04N 21/458* (2013.01); *H04N 21/4532* (2013.01); *H04N 21/472* (2013.01); *H04N 21/4728* (2013.01); *H04N 21/47205* (2013.01); *H04N 21/47217* (2013.01); *H04N 21/812* (2013.01); *H04N 21/8153* (2013.01)

(58) Field of Classification Search
CPC ....... H04N 21/23424; H04N 21/44016; H04N 21/4316; G06Q 10/101; G06Q 30/02
See application file for complete search history.

(56) References Cited

U.S. PATENT DOCUMENTS

| | | |
|---|---|---|
| 2006/0174263 A1 | 8/2006 | Ducheneaut et al. |
| 2007/0043616 A1 | 2/2007 | Kutaragi et al. |
| 2010/0119204 A1* | 5/2010 | Yamasaki ............ G11B 27/034 386/278 |
| 2010/0205562 A1* | 8/2010 | de Heer ........... H04N 21/23424 715/810 |
| 2011/0235997 A1 | 9/2011 | Kelly |
| 2013/0066623 A1 | 3/2013 | Chou et al. |
| 2015/0326925 A1* | 11/2015 | Ozkan .................. H04N 21/466 725/36 |
| 2017/0062009 A1* | 3/2017 | Clifton ................ G11B 27/034 |

FOREIGN PATENT DOCUMENTS

| | | |
|---|---|---|
| CN | 201369799 Y | 12/2009 |
| CN | 101652931 A | 2/2010 |
| CN | 101785298 A | 7/2010 |
| CN | 101950578 A | 1/2011 |
| CN | 103686254 A | 3/2014 |
| CN | 103686343 A | 3/2014 |
| CN | 104581351 A | 4/2015 |
| CN | 104602029 A | 5/2015 |
| EP | 2150046 A1 | 2/2010 |
| EP | 2722808 A1 | 4/2014 |

* cited by examiner

METHOD AND APPARATUS FOR CONTENT INSERTION DURING VIDEO PLAYBACK, AND STORAGE MEDIUM

RELATED APPLICATION

This application claims priority to PCT Application No. PCT/CN2016/082493, filed on May 18, 2016, which claims priority to Chinese Patent Application No. 201510562909.0, entitled "METHOD AND SYSTEM FOR CONTENT INSERTION DURING VIDEO PLAYBACK" filed with the Chinese Patent Office on Sep. 7, 2015, which is incorporated herein by reference in its entirety.

FIELD OF THE TECHNOLOGY

The present disclosure relates to the field of video processing technologies, and in particular, to a method and an apparatus for content insertion during video playback, and related storage medium.

BACKGROUND OF THE DISCLOSURE

A video player, such as a player embedded in a web browser or a standalone player, usually refers to a software application capable of playing a video that is stored in a form of digital signal. A video player obtains a video file from a local memory or a network to obtain information such as an audio or a video coding parameter or a video duration from the file and play the video according to data obtained by parsing the video file.

To insert video content during video playback, when the content of a video needs to be modified or content insertion needs to be performed, a producer modifies a source file of the video, adds an image or a new video segment, and then re-uploads and stores a modified source file of the video. Because modification of a source file of a video can only be implemented by a professional, and relates to a relatively large quantity of complex operations, the modification is often time-consuming.

SUMMARY

Based on the above, a method and an apparatus for content insertion during video playback, and a storage medium that are capable of improving operation convenience need to be provided.

Present disclosure provides a method for content insertion during video playback. The method for content insertion during video playback includes receiving, by a computing terminal including at least one processor, a setting parameter and insertion content, the setting parameter comprising an insertion time period and an insertion region of the insertion content in a video; and importing, by the computing terminal, the insertion content to the insertion region within the insertion time period.

An apparatus for content insertion during video playback, including a memory and a processor, an executable instruction being stored in the memory, and the executable instruction, when executed by the processor, causing the processor to perform the following steps: receiving a setting parameter and insertion content, the setting parameter comprising an insertion time period and an insertion region of the insertion content in a video; and importing the insertion content to the insertion region within the insertion time period.

One or more non-volatile computer readable storage media storing computer executable instructions, the computer executable instructions, when executed by one or more processors, causing the one or more processors to perform the following steps: receiving a setting parameter and insertion content, the setting parameter comprising an insertion time period and an insertion region of the insertion content in a video; and importing the insertion content to the insertion region within the insertion time period.

Details of one or more embodiments of the present disclosure are provided in the following accompanying drawings and descriptions. Other features, objectives and advantages of the present disclosure are clearer in the descriptions of the specification, the accompanying drawings, and the claims.

BRIEF DESCRIPTION OF THE DRAWINGS

To describe the technical solutions in the embodiments of the present disclosure or in the existing technology more clearly, the following briefly describes the accompanying drawings required for describing the embodiments or the existing technology. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
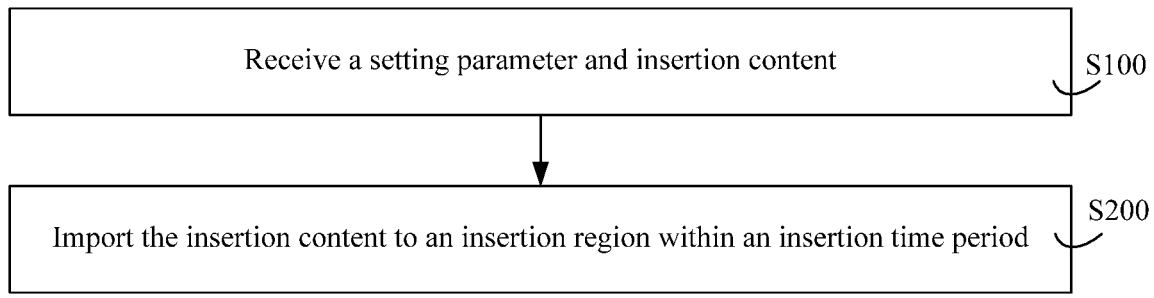
FIG. 1 is a flowchart of a method for content insertion during video playback according to an embodiment of the present disclosure.

The present disclosure provides a method for content insertion during video playback. The method can be implemented on a computing terminal such as a mobile phone, a smart tablet, a computer, a server, etc. The computing terminal can be installed with a web browser and/or a standalone player. The method can be applicable to a player that is embedded in the web browser or the standalone player. As shown in FIG. 1, the method for content insertion during video playback includes the following steps:

Step S100: The computing terminal receives a setting parameter entered by a user and insertion content selected by the user. The setting parameter may be entered and the insertion content may be selected by the user by using a device such as a touchscreen or a keyboard. The setting parameter may include an insertion time period and an insertion region of the insertion content in a video. The insertion time period may include a start time and an end time of the insertion content when the video is played, and may be adjusted according to an actual situation and a user requirement. For example, a time segment from a start of the video to a middle time point of the video may be used as the insertion time period, or a middle segment of the video may be used as the insertion time period, or a time segment from a middle time point of the video to an end of the video may be used as the insertion time period. The insertion region is used for indicating a location of the insertion content, and may be a part of a display interface, or may be the entire display interface. The insertion content may be specifically a video, an image, or a combination of a video and an image, or may be other content. In addition, the setting parameter may further include a display format. Different insertion content corresponds to different display formats. For example, when the insertion content include multiple images, a display format may be used for limiting information such as an insertion sequence and display duration of the images, and whether the images are displayed continuously or displayed at an interval.

Step S200: The computing terminal imports the insertion content to an insertion region within an insertion time period. The insertion content is imported to the insertion region within the insertion time period. One way in which the insertion content is imported to the insertion region may be replacing the original content that is in the insertion region with the insertion content, or may be covering the original content that is in the insertion region with the insertion content. In the foregoing manner, an operation of content insertion during video playback is completed without modifying a source file of a video, which means the operation is easy and fast.

Figure 2:
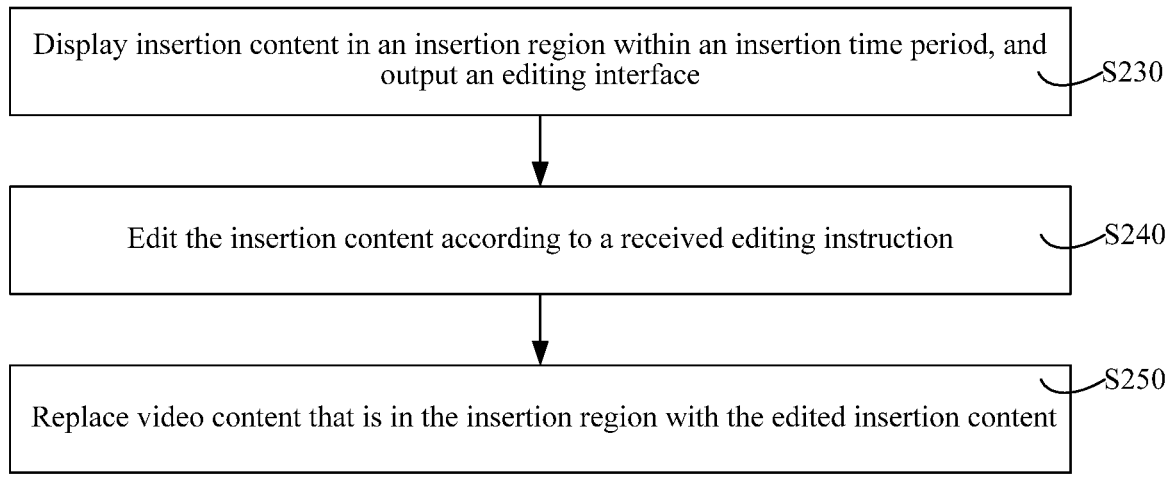
FIG. 2 is a flowchart of importing insertion content to an insertion region within an insertion time period according to an embodiment of the present disclosure.

In one embodiment, as shown in FIG. 2, step S200 may include step S230 to step S250.

Step S230: The computing terminal displays the insertion content in the insertion region within the insertion time period, and output an editing interface. A content insertion mode may be enabled within the insertion time period. The insertion content selected by the user may be displayed in the insertion region, and the editing interface may be generated, so that the user can edit the insertion content. It may be understood that the output editing interfaces that correspond to different insertion content may be different to some extent. For example, when the insertion content is an image, an editing interface may be used for assisting the user to edit the image. When the insertion content is a video, an editing interface may be used for assisting the user to edit the video. The editing interface is provided for the user to edit the insertion content, thereby improving operation convenience.

Step S240: The computing terminal edits the insertion content according to a received editing instruction, so that the insertion content matches the insertion region. The user may edit the insertion content according to the editing interface. Specifically, the user may adjust a parameter such as a size, a pixel, or a transparency of the insertion content, so that the insertion content matches the insertion region.

Figure 3:
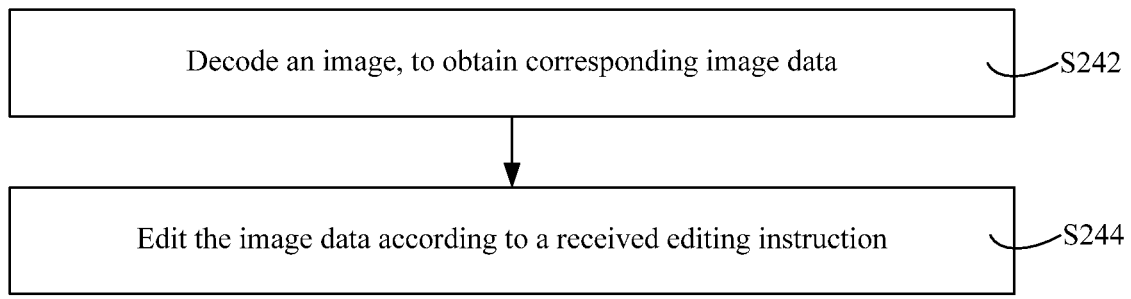
FIG. 3 is a flowchart of editing insertion content according to a received editing instruction, so that the insertion content matches an insertion region according to an embodiment of the present disclosure.

In one embodiment, the insertion content may be an image. A format and a size of the image may not be limited. A common format may be jpg or bmp. Because a resolution of a video is specified, and a maximum resolution of a web video may be generally below 1280×720 pixels, while an insertion region is relatively small, in this embodiment, the size of the image may be below 352×288, which may make it more convenient to edit the image. A ratio of the resolution to the size of the image may further be set to be the same as a ratio of the insertion region, so that distortion of the image may be avoided, thereby preventing the visual effect from being affected. In addition, a background color of the selected image may be the same as a background color of the selected region. This may also help prevent the visual effect from being affected. As shown in FIG. 3, step S240 may further include step S242 and step S244.

Step S242: The computing terminal decodes an image, to obtain corresponding image data. A video for decoding may be in the YUV420 format, and an image may be stored in the jpg format or the bmp format. Therefore, in this embodiment, the image may be decoded, to change the image to the YUV format. The obtained image data may be YUV data.

Step S244: The computing terminal edits the image data according to the received editing instruction. The user may enter the editing instruction by using a device such as a touchscreen or a mouse with reference to the editing interface, to implement image edition and match the image and the insertion region. Further, in this embodiment, step S244 may include: performing a position adjusting process and/or a zooming process on the image data. That is, the output editing interface may include a direction offset tool and/or a zooming tool that may be specifically selected as needed. The position adjusting processing and zooming process may be performed on the image data according to the determined insertion region and with reference to the editing interface, so that the image matches the insertion region.

It may be understood that, in another embodiment, step S244 may further include another image editing processing step. For example, a parameter of the image such as a brightness value, a contrast value, or a transparency value may be adjusted. If the insertions of content are of different formats, corresponding editing processing steps may be different.

Step S250: The computing terminal replaces video content that is in the insertion region with the edited insertion content. The original video content in the insertion region may be directly replaced with the edited insertion content, so that the insertion content is joined with entire content of the video image, thereby completing the operation of content insertion during video playback.

In one embodiment, before step S230 is performed, step S200 may further include a step of reducing a playback speed of the video.

There may be various methods for reducing the playback speed of the video. In this embodiment, the playback speed of the video may be reduced in the following steps: playing the video at a preset speed value or playing the video frame by frame. A user may select a format according to an actual situation. Specifically, the playback speed of the video may be reduced only within the insertion time period, or in a preset scenario that is before the insertion time period, or the playback speed of the video may be reduced when the video is played at a preset time point that is before the insertion time period. The playback speed of the video is reduced first before the video is edited, and then step S230 to step S250 are performed, so that the user can determine the start time and the end time of the content insertion more accurately. As such, an operation such as adjusting the location and the size of the insertion content may be facilitated, thereby improving operation convenience.

In one embodiment, after step S230 and before step S240, step S200 may further include the following steps: displaying an auxiliary line on an edge of the insertion region; or displaying auxiliary information by filling in the insertion region.

The displaying an auxiliary line on an edge of the insertion region may be displaying a straight line or a dashed line. The displaying auxiliary information by filling in the insertion region may be displaying a single color or multiple colors, or may be displaying other information. Using the auxiliary information being a single color as an example, a color of the auxiliary line and a color of the auxiliary information may be preset. For example, the color of the auxiliary line and the color of the auxiliary information may be a highlight color such as yellow or red, or may be determined according to a selection instruction entered by the user. For example, a color selection tool may be included on the auxiliary interface output in step S230, and the user may set the color of the auxiliary line and the color of the auxiliary information by using the color selection tool.

The auxiliary line and the auxiliary information may be further displayed before the insertion content is edited, so that the user can locate the insertion content accurately. In addition, the user may select a specific auxiliary line and/or color according to a requirement, thereby improving editing operation convenience.

In one embodiment, after step S250, step S200 may further include a step of performing blending processing on an edge of the insertion region. In this embodiment, specifically, blending processing is performed on a pixel of the edge of the insertion region, to adjust a color of a border between the insertion content and the video, thereby reducing a color difference and ensuring a watching effect. It may be understood that, in another embodiment, a line or another feature of the edge may be processed. For example, a line may be smudged by being lightened or expanded, so that the line of the edge is blended in with the video image. This can also ensure the watching effect.

The foregoing method for content insertion during video playback may include: receiving a setting parameter entered by a user and insertion content selected by the user, the setting parameter including an insertion time period and an insertion region of the insertion content in a video; and importing the insertion content to the insertion region within the insertion time period. During video playback, a user may insert content into the video that is being played without modifying a source file of the video. In this way, the content insertion can be implemented without any professional knowledge, and the operation is easy and fast, thereby improving operation convenience.

Figure 4:
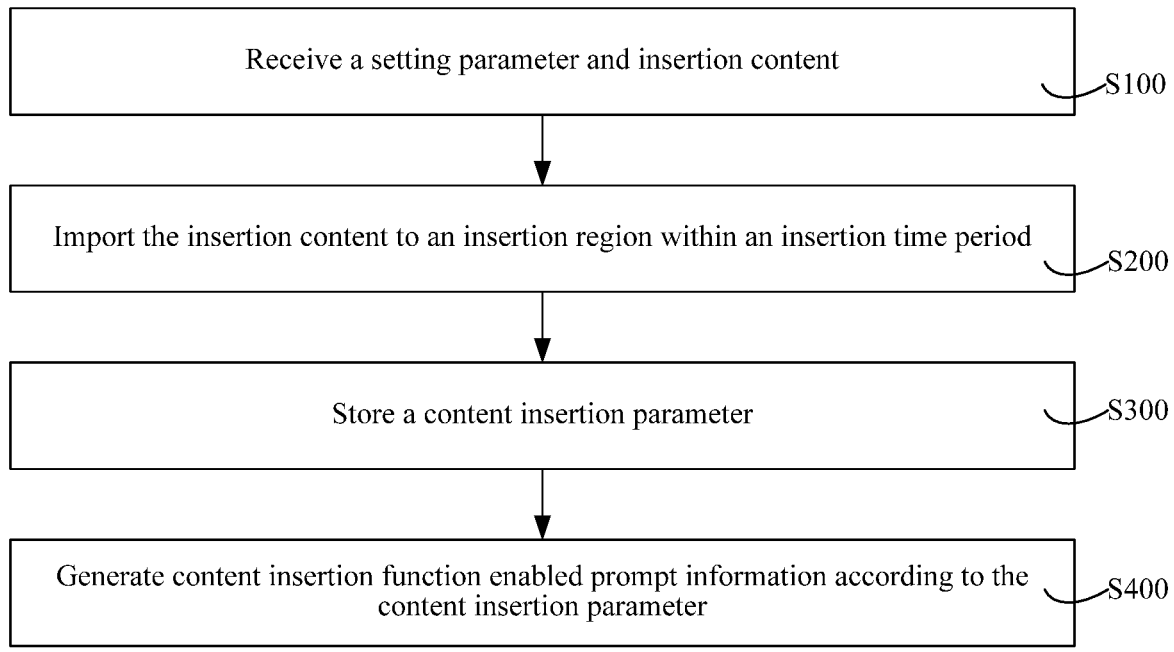
FIG. 4 is a flowchart of importing insertion content to an insertion region within an insertion time period according to another embodiment of the present disclosure.

In one embodiment, as shown in FIG. 4, after step S200, the method for content insertion during video playback may further include step S300.

Step S300: The computing terminal stores a content insertion parameter, the content insertion parameter including a unique identifier of the video, the insertion time period, the insertion region, and a storage path and editing data of the insertion content. The storage path of the insertion content is used for indicating a storage location of the insertion content. The editing data of the insertion content specifically includes relevant data obtained after the insertion content is edited, for example, a parameter such as a coordinate, a size, or a pixel number of the edited insertion content. The content insertion parameter is stored after the insertion content is imported to the insertion region, so that the content insertion parameter can be invoked during subsequent playback without generating a new video for storage, thereby reducing storage space. Edition may be performed on the original content insertion parameter when further edition is required, thereby improving operation convenience.

Further, referring to FIG. 4, after step S300, the method for content insertion during video playback may further include step S400.

Step S400: The computing terminal generates content insertion function enabled prompt information according to the content insertion parameter. The content insertion function enabled prompt information may be displayed when the video is played again. The content insertion function enabled prompt information may be displayed on the display interface when the user plays the video again. Specifically, "whether to enable a content insertion mode?" or similar information may be displayed, and a virtual button with a character of "yes" and a virtual button with a character of "no" are generated. If the user clicks the virtual button "yes", the content insertion mode is enabled, and the insertion content may be displayed in the insertion region when the video is played to the insertion time period. If the user clicks the virtual button "no", the content insertion mode is disabled, and only the original video is played.

The content insertion function enabled prompt information is generated according to the content insertion parameter, so that the content insertion function enabled prompt information may be displayed when the video is played again, and the user can select whether to enable the content insertion mode, thereby improving operation convenience.

The foregoing explains and describes the method for content insertion during video playback by using an application scenario in which a user needs to insert content into a video when the user watches the video. It may be understood that the application scenario of the foregoing method for content insertion during video playback is not unique. For example, when a video provided by a third party is played for a user by using a player in a web browser, a backend worker of the player may determine whether an operation of content insertion needs to be performed on the video according to an actual situation. For example, some advertising pictures may be inserted when an image of an entirely blank wall appears in the video.

When the backend worker needs to insert an advertisement into the video, the backend worker may enter a setting parameter, select an advertising picture that needs to be inserted, and edit the advertising picture according to an editing job after the advertising picture may be displayed in the insertion region. After the operation of inserting the advertising picture is completed, the original video file does not need to be separately stored, and the video may still be stored on a server of the provider of the video. The advertising picture and relevant content insertion parameter may be stored on a server that performs advertisement management. When the user plays the video by using the player that is in the web browser, the user may select whether to display the advertisement. If the user selects "yes", the advertising picture and the relevant content insertion parameter may be obtained from the server that performs advertisement management. The insertion content is imported to the insertion region within the insertion time period, that is, the advertising picture may be displayed in the video.

In the application scenario in which an advertisement is inserted, recognition and authentication may be performed on a user identity, and the insertion time period, the insertion region, and the insertion content may be selected according to the user identity. Specifically, recognition and authentication may be performed on the identity by detecting whether the user completes account login. After the user completes account login, the recognition and authentication on the identity succeeds, and a matching advertising picture may be selected as the insertion content. In addition, authentication may also be performed on a unique identifier of the video that is played. The unique identifier is used for distinguishing the video. The video to which content needs to be inserted is targeted at, and has a unique identifier. If the video that is played is a video to which content needs to be inserted, authentication on the video succeeds, and content may be inserted when the video is played. If the authentication on the video fails, content is not inserted when the video is played. By means of video authentication, an error can be avoided, thereby improving operation reliability. A video may have multiple types of unique identifiers. The unique identifiers may be selected according to an actual situation, and corresponding authentication manners may also be different to some extent. For example, authentication may be performed according to a network address or a part of byte content.

Figure 5:
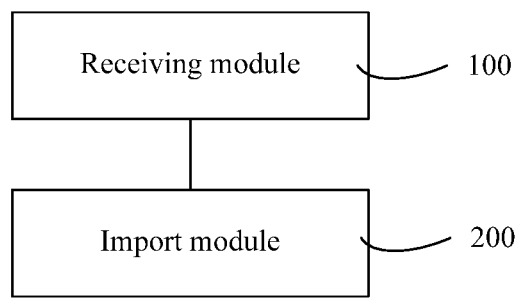
FIG. 5 is a structural diagram of an apparatus for content insertion during video playback according to an embodiment of the present disclosure.

An apparatus for content insertion during video playback according to an embodiment is provided, and includes a memory and a processor, an executable instruction being stored in the memory. As shown in FIG. 5, the memory includes a receiving module 100 and an import module 200. When executed by the processor, the executable instruction causes the processor to perform a function of the receiving module 100 and a function of the import module 200.

The receiving module 100 may be configured to receive a setting parameter entered by a user and insertion content selected by the user. The setting parameter may be entered and the insertion content may be selected by the user by using a device such as a touchscreen or a keyboard. The setting parameter may include an insertion time period and an insertion region of the insertion content in a video. The insertion time period may include a start time and an end time of the insertion content when the video is played, and may be adjusted according to an actual situation and a user requirement. For example, a time segment from a start of the video to a middle time point of the video may be used as the insertion time period, or a middle segment of the video may be used as the insertion time period, or a time segment from a middle time point of the video to an end of the video may be used as the insertion time period. The insertion region is used for indicating a location of the insertion content, and may be a part of a display interface, or may be the entire display interface. The insertion content may be specifically a video, an image, or a combination of a video and an image, or may be other content. In addition, the setting parameter may further include a display format. Different insertion content corresponds to different display formats. For example, when the insertion content include multiple images, a display format may be used for limiting information such as an insertion sequence and display duration of the images, and whether the images are displayed continuously or displayed at an interval.

The import module 200 may be configured to import the insertion content to the insertion region within the insertion time period. The insertion content is imported to the insertion region within the insertion time period. One way in which the insertion content is imported to the insertion region may be replacing original content that is in the insertion region with the insertion content, or may be covering the original content that is in the insertion region with the insertion content. In the foregoing manner, an operation of content insertion during video playback is completed without modifying a source file of a video, so that the operation is easy and fast.

Figure 6:
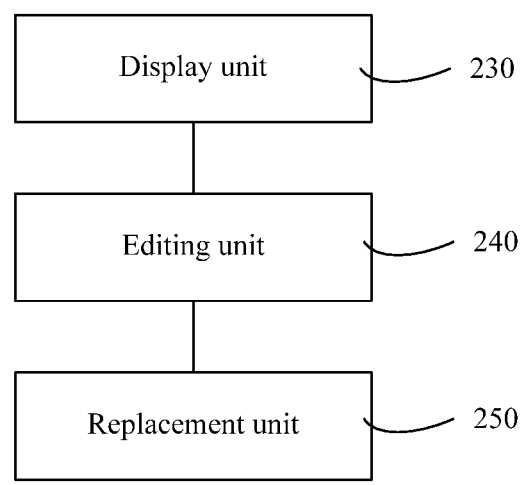
FIG. 6 is a structural diagram of an import module according to an embodiment of the present disclosure.

In one embodiment, as shown in FIG. 6, the import module 200 includes a display unit 230, an editing unit 240, and a replacement unit 250. The processor can perform a function of the display unit 230, a function of the editing unit 240, and a function of the replacement unit 250.

The display unit 230 may be configured to display the insertion content in the insertion region within the insertion time period, and output an editing interface. A content insertion mode is enabled within the insertion time period. The insertion content selected by the user may be displayed in the insertion region, and the editing interface is output, so that the user can edit the insertion content. It may be understood that output editing interfaces that correspond to different insertion content may be different to some extent. For example, when the insertion content is an image, an editing interface is used for assisting the user to edit the image. When the insertion content is a video, an editing interface is used for assisting the user to edit the video. The editing interface is provided, so that the user can edit the insertion content, thereby improving operation convenience.

The editing unit 240 may be configured to edit the insertion content according to a received editing instruction, so that the insertion content matches the insertion region. The user edits the insertion content according to the editing interface. Specifically, the user may adjust a parameter such as a size, a pixel, or a transparency of the insertion content, so that the insertion content matches the insertion region.

Figure 7:
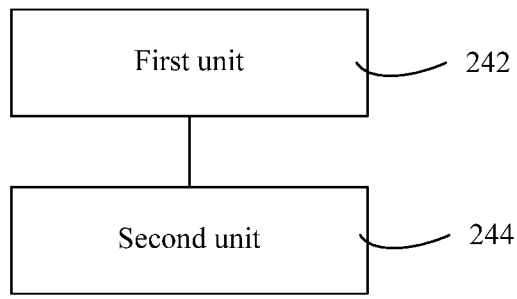
FIG. 7 is a structural diagram of an editing unit according to an embodiment of the present disclosure.

In one embodiment, the insertion content is an image. A format and a size of the image may not be limited. A common format may be jpg or bmp. Because a resolution of a video is specified, and a maximum resolution of a web video may be generally below 1280×720 pixels, while an insertion region is relatively small, in this embodiment, the size of the image may be below 352×288, so that it is convenient to edit the image. A ratio of the resolution to the size of the image may further be set to be the same as a ratio of the insertion region, so that distortion of the image may be avoided, thereby preventing a visual effect from being affected. In addition, a background color of the selected image may be the same as a background color of the selected region. This also helps prevent the visual effect from being affected. As shown in FIG. 7, the editing unit 240 may include a first unit 242 and a second unit 244. The processor can perform a function of the first unit 242 and a function of the second unit 244.

The first unit 242 may be configured to decode the image, to obtain corresponding image data. A video for decoding may be in a YUV420 format, and an image may be stored in the jpg format or the bmp format. Therefore, in this embodiment, the image may be decoded, to change the image to the YUV format, so that obtained image data is YUV data.

The second unit 244 may be may be configured to edit the image data according to the received editing instruction. The user may enter the editing instruction by using a device such as a touchscreen or a mouse with reference to the editing interface, to implement image edition and match the image and the insertion region. Further, the second unit 244 edits the image data according to the received editing instruction may include: performing a position adjusting process and/or a zooming process on the image data. That is, the editing interface outputted by the display unit 230 may include a direction offset tool and/or a zooming tool that may be specifically selected according to an actual situation. The position adjusting process and zooming process are performed on the image data according to the determined insertion region and with reference to the editing interface, so that the image matches the insertion region.

It may be understood that, in another embodiment, the second unit S244 may further use another image editing processing method. For example, a parameter of the image such as a brightness value, a contrast value, or a transparency value may be adjusted. If the insertion content is a video or another file, a corresponding editing processing method may be different to some extent.

The replacement unit 250 may be configured to replace video content that is in the insertion region with the edited insertion content. The original video content in the insertion region may be directly replaced with the edited insertion content, so that the insertion content is blended with entire content of the video, thereby completing the operation of content insertion during video playback.

In one embodiment, the import module 200 may further include a reduction unit. The processor can further perform a function of the reduction unit. The reduction unit may be configured to reduce a playback speed of the video before the display unit 230 displays the insertion content in the insertion region within the insertion time period and outputs an editing interface.

There may be various methods for reducing the playback speed of the video. In this embodiment, the playback speed of the video may be reduced in the following steps: playing the video at a preset speed value or playing the video frame by frame. A user may select a format according to an actual situation. Specifically, the playback speed of the video may be reduced only within the insertion time period, or in a preset scenario that is before the insertion time period, or the playback speed of the video may be reduced when the video is played at a preset time point that is before the insertion time period. The playback speed of the video may be reduced first before the video is edited, so that the user can determine the start time and the end time of the content insertion more accurately, and that an operation such as adjusting the location and the size of the insertion content may be facilitated, thereby improving operation convenience.

In one embodiment, the import module 200 may further include an auxiliary unit. The processor can further perform a function of the auxiliary unit. The auxiliary unit may be configured to display an auxiliary line on an edge of the insertion region, or display auxiliary information by filling in the insertion region after the display unit 230 displays the insertion content in the insertion region within the insertion time period and outputs an editing interface, and before the editing unit 240 edits the insertion content according to a received editing instruction.

The displaying an auxiliary line on an edge of the insertion region may be displaying a straight line or a dashed line. The displaying auxiliary information by filling in the insertion region may be displaying a single color or multiple colors, or may be displaying other information. Using the auxiliary information being a single color as an example, a color of the auxiliary line and a color of the auxiliary information may be preset. For example, the color of the auxiliary line and the color of the auxiliary information may be a highlight color such as yellow or red, or may be determined according to a selection instruction entered by the user. For example, a color selection tool may be included on the auxiliary interface outputted by the display unit 230, and the user may set the color of the auxiliary line and the color of the auxiliary information by using the color selection tool.

The auxiliary line and the auxiliary information may be further displayed before the insertion content is edited, so that the user can locate the insertion content accurately. In addition, the user may select a specific auxiliary line and/or color according to a requirement, thereby improving editing operation convenience.

In one embodiment, the import module 200 may further include a processing unit. The processor can further perform a function of the processing unit. The processing unit may be configured to perform blending processing on an edge of the insertion region after the replacement unit 250 replaces the video content that is in the insertion region with the edited insertion content. In this embodiment, specifically, blending processing is performed on a pixel of the edge of the insertion region, to adjust a color of a border between the insertion content and the video, thereby reducing a color difference and ensuring a watching effect. It may be understood that, in another embodiment, a line or another feature of the edge may be processed by the processing unit. For example, a line may be smudged by being lightened or expanded, so that the line of the edge is blended in with the video image. This can also ensure the quality of the image display.

In the foregoing apparatus for content insertion during video playback, when executed by the processor, the executable instruction in the memory causes the processor to perform the function of the receiving module 100 and the function of the import module 200. The receiving module 100 may receive a setting parameter entered by a user and insertion content selected by the user, the setting parameter including an insertion time period and an insertion region of the insertion content in a video; and the import module 200 may import the insertion content to the insertion region within the insertion time period. During video playback, a user may insert content into the video that is being played without modifying a source file of the video. In this way, the content insertion can be implemented without any professional knowledge, and the operation is easy and fast, thereby improving operation convenience.

Figure 8:
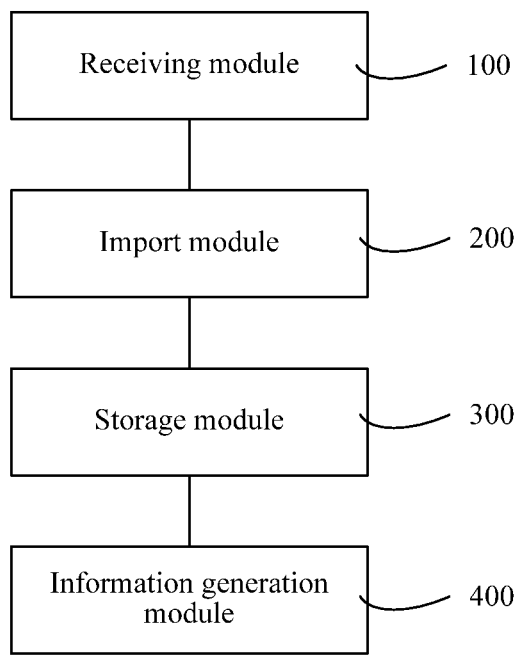
FIG. 8 is a structural diagram of an apparatus for content insertion during video playback according to another embodiment of the present disclosure.

In one embodiment, as shown in FIG. 8, the memory in the apparatus for content insertion during video playback may further include a storage module 300. The processor can perform a function of the storage module 300. The storage module 300 may be configured to store a content insertion parameter after the import module 200 imports the insertion content to the insertion region within the insertion time period. The content insertion parameter including a unique identifier of the video, the insertion time period, the insertion region, and a storage path and editing data of the insertion content. The storage path of the insertion content is used for indicating a storage location of the insertion content. The editing data of the insertion content specifically includes relevant data obtained after the insertion content is edited, for example, a parameter such as a coordinate, a size, or a pixel adjustment of the edited insertion content. The content insertion parameter is stored after the insertion content is imported to the insertion region, so that the content insertion parameter can be invoked during subsequent playback or be further edited, thereby improving operation convenience.

Further, referring to FIG. 8, the memory in the apparatus for content insertion during video playback may further include an information generation module 400. The processor can further perform a function of the information generation module 400. The information generation module 400 may be configured to generate content insertion function enabled prompt information according to the content insertion parameter after the storage module 300 stores the content insertion parameter. The content insertion function enabled prompt information may be displayed when the video is played again. The content insertion function enabled prompt information may be displayed on the display interface when the user plays the video again. Specifically, "whether to enable a content insertion mode?" or similar information may be displayed, and a virtual button with a character of "yes" and a virtual button with a character of "no" are generated. If the user clicks the virtual button "yes", the content insertion mode is enabled, and the insertion content may be displayed in the insertion region when the video is played to the insertion time period. If the user clicks the virtual button "no", the content insertion mode is disabled, and only the original video is played.

The content insertion function enabled prompt information is generated according to the content insertion parameter, so that the content insertion function enabled prompt information may be displayed when the video is played again, and the user can select whether to enable the content insertion mode, thereby improving operation convenience.

After storing the content insertion parameter, the processor may further perform the following steps: performing recognition and authentication on a user identity, and selecting the insertion time period, the insertion region, and the insertion content according to the user identity. Specifically, recognition and authentication may be performed on the identity by detecting whether the user completes account login. After the user completes account login, the recognition and authentication on the identity succeeds, and a matching advertising picture may be selected as the insertion content.

One or more non-volatile computer readable storage media storing computer executable instructions according to an embodiment may be provided, the computer executable instructions, when executed by one or more processors, causing the one or more processors to perform the following steps: receiving a setting parameter entered by a user and insertion content selected by the user, the setting parameter including an insertion time period and an insertion region of the insertion content in a video; and importing the insertion content to the insertion region within the insertion time period.

When the computer executable instructions stored in the one or more non-volatile computer readable storage media are executed by one or more processors, the processors may receive a setting parameter entered by a user and insertion content selected by the user, and import the insertion content to an insertion region within an insertion time period. During video playback, a user may insert content into the video that is being played without modifying a source file of the video. In this way, the content insertion can be implemented without any professional knowledge, and the operation is easy and fast, thereby improving operation convenience.

Figure 9:
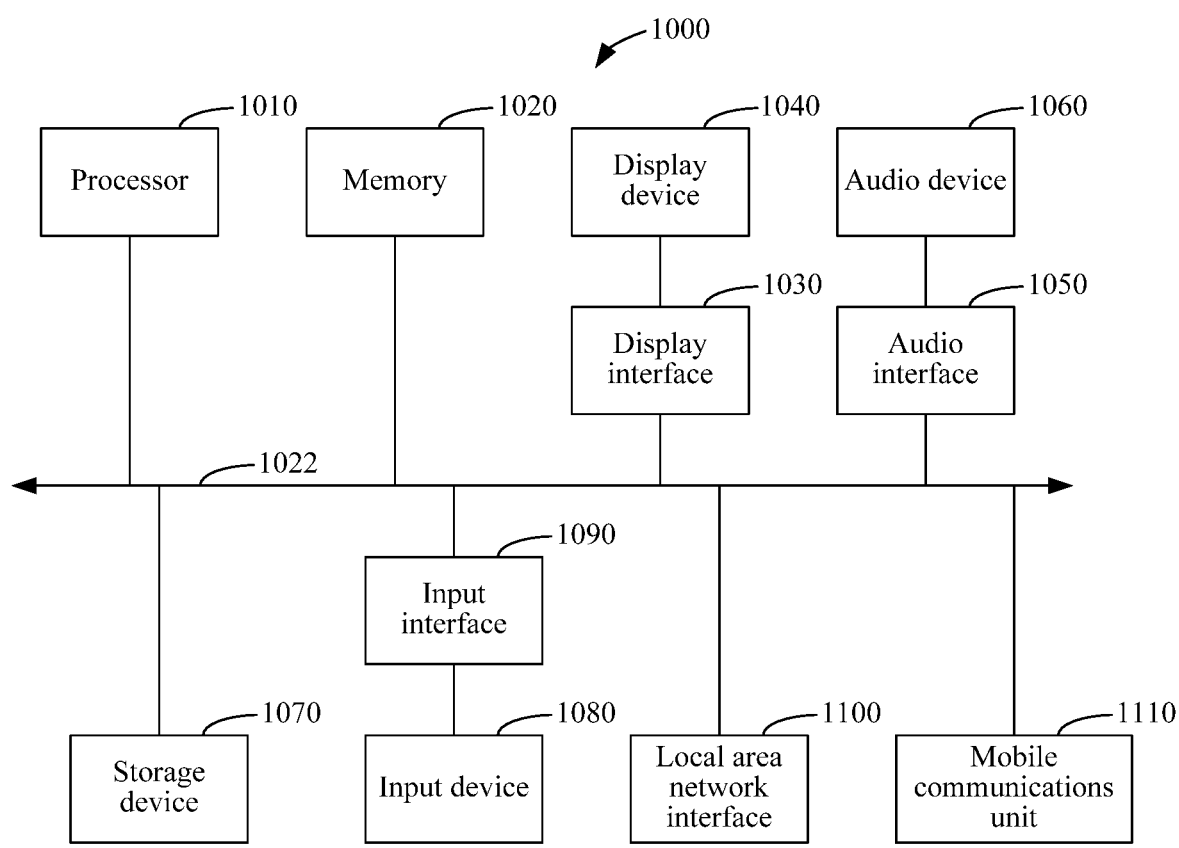
FIG. 9 is a block diagram of a computer system according to an embodiment of the present disclosure.

FIG. 9 is a block diagram of a computer system 1000 that can implement the embodiments of the present disclosure. The computer system 1000 is merely an example of computer environments applicable to the present disclosure, and should not be construed as any limitation on the application scope of the present disclosure. The computer system 1000 also should not be interpreted as needing to rely on or have one part or a combination of parts of the exemplary computer system 1000 shown in FIG. 9.

The computer system 1000 shown in FIG. 9 is an example of computer systems applicable to the present disclosure. Other architectures having different subsystem configurations may also be used. For example, well-known devices such as a desktop, a notebook computer, a personal digital assistant, a smartphone, a tablet computer, and a portable media player are applicable to some embodiments of the present disclosure, but the present disclosure is not limited thereto.

As shown in FIG. 9, the computer system 1000 includes a processor 1010, a memory 1020, and a system bus 1022. Various system components including the memory 1020 and the processor 1010 are connected to the system bus 1022. The processor 1010 is hardware for executing computer program instructions by means of basic arithmetic and logic operations in the computer system. The memory 1020 is a physical device for temporarily or permanently storing computer programs or data (for example, program state information). The system bus 1020 may be any one of the following types of bus structures: a memory bus or memory controller, a peripheral bus and a local bus. The processor 1010 and the memory 1020 can perform data communication by using the system bus 1022. The memory 1020 includes a read-only memory (ROM) or a flash memory (both not shown in the figure), and a random access memory (RAM). The RAM generally refers to main memory loaded with an operating system and application programs.

The computer system 1000 may further include a display interface 1030 (for example, a graphics processing unit), a display device 1040 (for example, a liquid crystal display), an audio interface 1050 (for example, a sound card) and an audio device 1060 (for example, a speaker). The display device 1040 and the audio device 1060 are media devices for presenting multimedia content.

The computer system 1000 generally includes one storage device 1070. The storage device 1070 may be selected from multiple types of computer readable media. The computer readable media refer to any available media that can be accessed by the computer system 1000, and include removable media and non-removable media. For example, the computer readable media include, but are not limited to, a flash memory (micro SD card), a CD-ROM, a digital versatile disc (DVD) or other optical storage, a cassette, a magnetic tape, a disk storage or other magnetic storage devices, or any other media that can be used for storing required information and can be accessed by the computer system 1000.

The computer system 1000 may further include an input device 1080 and an input interface 1090 (for example, an TO controller). A user may enter an instruction and information into the computer system 1000 by using the input device 1080, such as a keyboard, a mouse or a touch panel device on the display device 1040. The input device 1080 is generally connected to the system bus 1022 through the input interface 1090, but may also be connected through other interfaces or bus structures, such as a universal serial bus (USB).

The computer system 1000 may be logically connected to one or more network devices in a network environment. The network device may be a personal computer, a server, a router, a smartphone, a tablet computer or other public network nodes. The computer system 1000 is connected to the network device through a local area network (LAN) interface 1100 or a mobile communications unit 1110. A local area network (LAN) refers to an interconnected computer network in a limited area such as a family, a school, a computer laboratory, or an office building using network media. WiFi and Ethernet over twisted pair are the most commonly used two technologies for building a local area network. WiFi is a technology that enables the computer systems 1000 to exchange data or to be connected to a wireless network through radio waves. The mobile communications unit 1110 is capable of making and receiving calls through radio communications lines while moving in a broad geographic area. In addition to calling, the mobile communications unit 1110 also supports Internet access in a 2G, 3G, or 4G cellular communications system that provides mobile data services.

It should be noted that other computer systems including more or fewer subsystems than those of the computer system 1000 are also applicable to the present disclosure. For example, the computer system 1000 may include a Bluetooth unit capable of exchanging data in a short distance, an image sensor for capturing images, and an accelerometer for measuring the acceleration.

As described above in detail, the computer system 1000 applicable to the present disclosure can perform specified operations in the method for content insertion during video playback. The computer system 1000 performs these operations in the form of running software instructions in the computer readable media by the processor 1010. These software instructions may be read into the memory 1020 from the storage device 1070 or from another device through the local area network interface 1100. The software instructions stored in the memory 1020 enable the processor 1010 to perform the method for content insertion during video playback. Moreover, the present disclosure may also be implemented by using a hardware circuit or by using a combination of a hardware circuit and software instructions. Therefore, the implementation of the present disclosure is not limited to any particular combination of a hardware circuit and software.

Each module or unit as described in relation to FIGS. 5-9 may refer to one or more computer programs/instructions stored in memory 1020 or storage device 1070. When executed by processor 1010, the computer programs/instructions may perform the operations as described in relation to FIGS. 1-4 and 5-9.

The technical features of the foregoing embodiments can be arbitrarily combined. For brevity of description, not all possible combinations of the technical features of the foregoing embodiments are described. However, these technical features should all be considered as content recorded in the specification as long as no contradiction exists among these technical features.

The foregoing embodiments only describe several implementations of the present disclosure, and their description is specific and detailed, but cannot therefore be understood as a limitation to the patent scope of the present disclosure. It should be noted that a person of ordinary skill in the art can make variations and improvements without departing from the concept of the present disclosure, and these all fall within the protection scope of the present disclosure. Therefore, the patent protection scope of the present disclosure should be subject to the appended claims.

What is claimed is:

1. A method for content insertion during video playback, comprising:

sending, by a first server, a video to a computing terminal;

receiving, by the computing terminal including at least one processor, the video for being played by a media player on the computing terminal;

sending, by a second server different from the first server, an insertion content to the computing terminal, the insertion content including a video clip;

receiving, by the computing terminal, a setting parameter inputted by a user of the computing terminal, the insertion content including a video clip, the setting parameter including an insertion time period and an insertion region of the insertion content in the video, and the insertion time period defining a start time and an end time respectively at which playing of the video clip starts and ends;

importing, by the computing terminal, the insertion content to the insertion region according to the setting parameter;

generating, by the computing terminal, a content insertion parameter according to the importing of the insertion content to the insertion region, the insertion content parameter including one or more parameters to reproduce the importing of the insertion content to the insertion region when the video is played again at the computing terminal;

storing the content insertion parameter at the computing terminal; and when the video is being played again, displaying, by the computing terminal, the insertion content in the insertion region within the insertion time period according to the insertion content parameter stored at the computing terminal without modifying a source file of the video at the first server and without modifying a source file of the insertion content at the second server.

2. The method according to claim 1, wherein the step of importing the insertion content to the insertion region within the insertion time period comprises:

displaying the insertion content in the insertion region within the insertion time period;

outputting an editing interface;

receiving an insertion content editing instruction;

editing the insertion content; and replacing video content with the edited insertion content.

3. The method according to claim 2, wherein before the displaying the insertion content in the insertion region within the insertion time period, and outputting an editing interface, the method further comprises:

reducing a playback speed of the video.

4. The method according to claim 3, wherein the reducing a playback speed of the video comprises:

playing the video at a preset speed or playing the video frame by frame.

5. The method according to claim 2, wherein the insertion content includes an image, and the step of editing the insertion content comprises:

decoding the image to obtain corresponding image data; and editing the image data according to the received editing instruction.

6. The method according to claim 2, the method further comprising:

displaying an auxiliary line on an edge of the insertion region; or displaying auxiliary information by filling in the insertion region.

7. The method according to claim 1, wherein the content insertion parameter includes a unique identifier of the video, the insertion time period, the insertion region, and a storage path and editing data of the insertion content.

8. The method according to claim 7, wherein after the storing a content insertion parameter, the method further comprises:

generating prompt information according to the content insertion parameter, the prompt information being displayed when the video is played again.

9. The method according to claim 7, wherein after the storing a content insertion parameter, the method further comprises:

performing, by the second server, authentication of the video being played by the computing terminal based on the unique identifier of the video;

performing, by the second server, recognition and authentication of a user identity corresponding to the computing terminal;

when the authentication of the video and the authentication of the user identity succeed, selecting, by the second server, the insertion time period, the insertion region, and the insertion content according to the user identity; and sending, by the second server, the selected insertion content and the setting parameter to the computing terminal for being imported and displayed with the video, wherein the setting parameter comprises the selected insertion time period and the selected insertion region.

10. The method according to claim 1, further comprising:
upon the video being played again, generating, by the computing terminal, an inquiry prompt on whether the insertion content is to be imported to the video according to the content insertion parameter stored at the computing terminal; and upon receiving a negative response from the user, playing the video without the insertion content by the terminal computer.

11. An apparatus for content insertion during video playback, comprising a memory and a processor, an executable instruction being stored in the memory, and the executable instruction, when executed by the processor, causing the processor to perform the following steps:

receiving a video for being played by a media player on the apparatus from a first server;

receiving a setting parameter and insertion content from a second server different from the first server, the insertion content including a video clip, the setting parameter including an insertion time period and an insertion region of the insertion content in the video, and the insertion time period defining a start time and an end time respectively at which playing of the video clip starts and ends;

importing the insertion content to the insertion region according to the setting parameter;

generating, by the computing terminal, a content insertion parameter according to the importing of the insertion content to the insertion region, the insertion content parameter including one or more parameters to reproduce the importing of the insertion content to the insertion region when the video is played again at the computing terminal;

storing the content insertion parameter at the computing terminal; and when the video is being played again, displaying the insertion content in the insertion region within the insertion time period according to the insertion content parameter stored at the computing terminal without modifying a source file of the video at the first server and without modifying a source file of the insertion content at the second server.

12. The apparatus according to claim 11, wherein the step of importing the insertion content to the insertion region within the insertion time period comprises:

displaying the insertion content in the insertion region within the insertion time period, and outputting an editing interface;

editing the insertion content according to a received editing instruction; and replacing video content that is in the insertion region with the edited insertion content.

13. The apparatus according to claim 12, wherein before the displaying the insertion content in the insertion region within the insertion time period, and outputting an editing interface, the processor performs the following step:
reducing a playback speed of the video.

14. The apparatus according to claim 12, wherein the insertion content includes an image, and the step of editing, by the processor, the insertion content according to a received editing instruction comprises:

decoding the image, to obtain corresponding image data; and editing the image data according to the received editing instruction.

15. The apparatus according to claim 12, wherein the processor may further perform the following step:

displaying an auxiliary line on an edge of the insertion region and displaying auxiliary information by filling in the insertion region.

16. The apparatus according to claim 11, wherein the content insertion parameter includes a unique identifier of the video, the insertion time period, the insertion region, and a storage path and editing data of the insertion content.

17. The apparatus according to claim 16, wherein after the storing a content insertion parameter, the processor further performs the following step:

generating prompt information according to the content insertion parameter, the prompt information being displayed when the video is played again.

18. The apparatus according to claim 16, wherein after the storing a content insertion parameter, the processor further performs the following steps:

providing the unique identifier of the video and a user identity corresponding to the apparatus to the second server so that the second server performs authentication of the video being played by the apparatus and performs recognition and authentication of the user identity, and wherein the insertion time period, the insertion region, and the insertion content is selected by the second server according to the user identity when the authentication of the video and the authentication of the user identity succeed; and receiving, from the second server, the selected insertion content and the setting parameter to the apparatus for being imported and displayed with the video, wherein the setting parameter comprises the selected insertion time period and the selected insertion region.

19. The apparatus according to claim 11, wherein the processor is further configured to perform:

upon the video being played again, generating, an inquiry prompt on whether the insertion content is to be imported to the video according to the content insertion parameter as stored; and upon receiving a negative response from the user, playing the video without the insertion content.

20. One or more non-transitory computer readable storage media storing computer executable instructions, the computer executable instructions, when executed by one or more processors of a computing terminal, causing the one or more processors to perform the following steps:

sending, by a first server, a video to the computing terminal;

receiving, by the computing terminal, the video for being played by a media player on the computing terminal;

sending, by a second server different from the first server, an insertion content to the computing terminal, the insertion content including a video clip;

receiving, by the computing terminal, a setting parameter inputted by a user of the computing terminal, the insertion content including a video clip, the setting parameter including an insertion time period and an insertion region of the insertion content in the video, and the insertion time period defining a start time and an end time respectively at which playing of the video clip starts and ends;

importing, by the computing terminal, the insertion content to the insertion region according to the setting parameter;

generating, by the computing terminal, a content insertion parameter according to the importing of the insertion content to the insertion region, the insertion content parameter including one or more parameters to reproduce the importing of the insertion content to the insertion region when the video is played again at the computing terminal;

storing the content insertion parameter at the computing terminal; and when the video is being played again, displaying, by the computing terminal, the insertion content in the insertion region within the insertion time period according to the insertion content parameter stored at the computing terminal without modifying a source file of the video at the first server and without modifying a source file of the insertion content at the second server.

* * * * *